United States Patent [19]

Anderton et al.

[11] Patent Number: 5,420,257
[45] Date of Patent: May 30, 1995

[54] REACTIVE TRIAZINE DYES, THEIR PREPARATION AND USE

[75] Inventors: Kenneth Anderton, Bury; Andrew P. Shawcross, Worsley, both of United Kingdom

[73] Assignee: Zeneca Limited, London, United Kingdom

[21] Appl. No.: 126,697

[22] Filed: Sep. 17, 1993

[30] Foreign Application Priority Data

Oct. 8, 1992 [GB] United Kingdom ............... 9221140

[51] Int. Cl.6 .................. C09B 62/503; D06P 1/384
[52] U.S. Cl. .................................. 534/642; 534/617; 534/618; 534/629; 534/637; 540/126; 544/76; 544/187; 544/189; 544/206; 544/207
[58] Field of Search ............... 534/617, 618, 629, 637, 534/642; 540/126; 544/76, 187, 189, 206, 207

[56] References Cited

U.S. PATENT DOCUMENTS

| 1,897,428 | 2/1933 | Hentrich et al. | 544/187 |
| 3,639,430 | 2/1972 | Altermatt | 534/629 X |
| 5,182,371 | 1/1993 | Siegel et al. | 534/637 X |

FOREIGN PATENT DOCUMENTS

| 2919509 | 11/1979 | Germany | 534/187 |
| 407373 | 8/1966 | Switzerland . | |
| 9021021 | 7/1962 | United Kingdom . | |
| 2007698 | 5/1979 | United Kingdom . | |
| 2008143 | 5/1979 | United Kingdom . | |
| 9201021 | 1/1992 | WIPO . | |

OTHER PUBLICATIONS

Greve et al.; Dyes and Pigments 7 (1986) 419–443.
Venkataraman: "The Chemistry of Synthetic Dyes" vol. VI, Reactive Dyes, (1972) 146–149.
Schlafer et al., Chemical Abstracts 109:8029F (1988).
Springer et al., Chemical Abstracts 116(24):237361v (1992).
Hibara, Chemical Abstracts 106 (26):215492e (1987).

*Primary Examiner*—Mary C. Lee
*Assistant Examiner*—Fiona T. Powers
*Attorney, Agent, or Firm*—Cushman, Darby & Cushman

[57] ABSTRACT

A reactive dye comprising a 1,3,5-s-triazine group having a chromophoric group at two of the 2-, 4- and 6-positions and a substituent at the remaining 2-, 4- or 6-position selected from H, optionally substituted alkyl, optionally substituted phenyl, $-CH(CO_2R^1)_2$, $-NR^1SO_2R^2$, and $-SO_2R^2$, wherein each $R^1$ is H or alkyl and $R^2$ is alkyl. The reactive dyes may be used for the coloration of textile materials.

12 Claims, No Drawings

REACTIVE TRIAZINE DYES, THEIR PREPARATION AND USE

This invention relates to reactive dyes, to a process for their preparation, to a process for the coloration of materials having amino or hydroxy groups and to such materials when coloured by the dyes.

Reactive dyes containing a 1,3,5-s-triazine group having a labile chlorine atom at one or both of the 2- and 4-positions are known. Such dyes may be reacted with cellulosic textile materials under alkaline conditions to form a covalent bond between the triazine ring and the textile by nucleophilic displacement of the labile chlorine.

According to the present invention there is provided a reactive dye comprising a 1,3,5-s-triazine group having a chromophoric group at two of the 2-, 4- and 6-positions and a substituent at the remaining 2-, 4- or 6-position selected from H, optionally substituted alkyl, optionally substituted phenyl —CH(CO$_2$R$^1$)$_2$, —NR$^1$SO$_2$R$^2$ and —SO$_2$R$^2$, wherein each R$^1$ is H or alkyl and R$^2$ is alkyl.

The chromophoric groups are preferably each independently of triphenodioxazine or more preferably of the azo, anthraquinone, formazan or phthalocyanine series. In one embodiment the two chromophoric groups are of the same series and in a second embodiment the two chromophoric groups are identical to each other.

The substituent at the remaining 2-, 4- or 6-position is preferably H, optionally substituted alkyl or optionally substituted phenyl, more preferably H or C$_{1-4}$-alkyl, especially H or methyl.

The optional substituent which may be present on the substituent at the remaining 2-, 4- or 6-position is preferably selected from hydroxy, carboxy, sulpho and halo.

R$^1$ is preferably H or C$_{1-4}$-alkyl. R$^2$ is preferably C$_{1-4}$-alkyl.

The chromophoric groups are preferably connected to the triazine group through an ether, thioether or amino link.

A preferred reactive dye according to the invention is of the Formula (1):

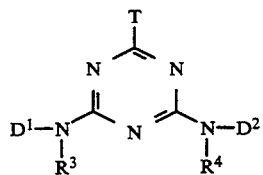

(1)

wherein:
D$^1$ and D$^2$ are each independently chromophoric groups;
R$^3$ and R$^4$ are each independently H or C$_{1-4}$-alkyl; and
T is H, optionally substituted alkyl, optionally substituted phenyl, —CH(CO$_2$R$^1$)$_2$, —NR$^1$SO$_2$R$^2$ or —SO$_2$R$^2$; and
R$^1$ and R$^2$ are as hereinbefore defined.

Preferred dyes according to the invention are free from organic chlorine, that is to say the dyes do not contain any carbon chlorine covalent bonds. Such dyes are particularly friendly to the environment.

Preferred chromophoric groups which may be represented by D$^1$ and D$^2$ are as hereinbefore described. In one embodiment D$^1$ is identical to D$^2$, in another embodiment D$^1$ and D$^2$ are different to each other.

Examples of reactive dyes of Formula (1) wherein D$^1$ and D$^2$ are different to each other include dyes wherein D$^1$ is an azo group and D$^2$ is an anthraquinone, formazan, phthalocyanine or triphenodioxazine group.

R$^3$ and R$^4$ are preferably H or methyl.

T is preferably H, optionally substituted alkyl or optionally substituted phenyl, more preferably H or C$_{1-4}$-alkyl, especially methyl, ethyl, n-propyl, isopropyl, n-butyl, sec-butyl or tert-butyl.

The reactive dye is preferably soluble in water. Water solubility may be achieved by the reactive dye having one or more, preferably 2 to 12, more preferably 2 to 6 water solubilising groups selected from carboxy and sulpho.

The reactive dye may be rendered reactive by the presence of one of more vinyl sulphonyl groups or groups which are convertible to vinyl sulphonyl groups on treatment with aqueous alkali.

Reactive dyes according to the invention may be prepared by condensation of a 2,6-dihalo-s-triazine having one of the aforementioned substituents at the 4-position (for example as defined by T) with a chromophoric compound having a nucleophilic substituent, for example an amino group. Reactive dyes where the chromophoric groups at the 2- and 6-positions are identical may be prepared by condensing at least about two molecular equivalents of the chromophoric compound and one equivalent of the dihalo-s-triazine. Reactive dyes having different substituents at the 2- and 6-positions may be prepared by sequential condensation of the chromophoric compounds and the dihalo-s-triazine.

An alternative method for preparing reactive dyes according to the invention is by condensation of a 2,6-dihalo-s-triazine having one of the aforementioned substituents at the 4-position (e.g. the group defined by T) with an aryl amine to give a coupling component, for example with an optionally substituted naphthylamine, followed by coupling with a diazonium salt, preferably a diazonium salt having a reactive substituent. The condensation is preferably performed as described above. Coupling with a diazonium salt may be achieved using general methods known per se in the dye art, for example an amine is converted to a diazonium salt by treatment with NaNO$_2$ at 0°–5° C. in dilute mineral acid and the resultant diazonium salt stirred at below 5° C. with the coupling component.

The abovementioned condensation may conveniently be carried out in an aqueous medium, preferably in the presence of an acid-binding agent. The function of the acid-binding agent is to neutralise the hydrogen halide as it is formed during the reaction. Accordingly any acid-binding agent may be used provided that it is not present in such a concentration that it causes hydrolysis of the reactants or causes some other undesirable side-reaction. It is preferred to use an alkali metal carbonate or bicarbonate, added at such a rate that the pH of the mixture stays within the range of 2 to 8. The temperature of the condensation may be between 0° C. and 100° C. depending upon the stability of the 2,6-dihalo-s-triazine and the ease with which the reaction occurs, preferably between 0° C. and 60° C., especially between 0° C. and 10° C.

Preferred reactive dyes according to the invention contain at least one chromophoric group of the azo series, for example one or both of D$^1$ and D$^2$ is a chromophore of the azo series. A preferred chromophore of the azo series is of Formula (2):

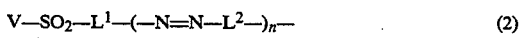

wherein:
V is vinyl or a group convertible to vinyl on treatment with aqueous alkali;
$L^1$ and each $L^2$ are each independently an optionally substituted mono- or dicyclic aryl or heteroaryl radical; and
n is 1 or 2.

Examples of groups convertible to vinyl on treatment with aqueous alkali include —CH$_2$CH$_2$OSO$_3$H, —CH$_2$CH$_2$SSO$_3$H and salts thereof.

When only one of the chromophoric groups is of Formula (2) the remaining chromophoric group is preferably of the anthraquinone, phthalocyanine, triphenodioxazine or formazan series.

$L^1$ and $L^2$ are preferably each independently an optionally substituted pyrollidone, phenylene or naphthylene group. $L^1$ is preferably optionally substituted pyrollidone or phenylene and $L^2$ is preferably optionally substituted naphthylene. The optional substituents are preferably alkyl, especially $C_{1-4}$-alkyl, more especially methyl; acylamino, especially acetylamino, benzamido or sulphonated benzamido; ureido; cyano; amino; sulpho; carboxy; hydroxy; or alkoxy, especially $C_{1-4}$-alkoxy, more especially methoxy.

As examples of groups represented by $L^1$ there may be mentioned 1,4-phenylene, 1,3-phenylene, 2,6-naphthylene, 2,5-naphthylene and sulpho-2,5-naphthylene.

A preferred optionally substituted naphthylene group represented by $L^2$ is of the Formula (3):

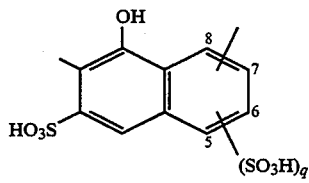

wherein:
q is 0 or 1.

Preferred anthraquinone chromophoric groups are of the Formula (4):

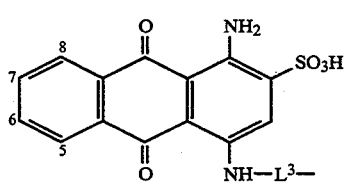

wherein the anthraquinone nucleus optionally contains a sulphonic acid group in one or more of the 5-, 6-, 7- and 8-positions and $L^3$ is a divalent organic linking group, preferably $C_{2-4}$-alkylene, more preferably a radical of the benzene series, for example a phenylene, diphenylene, 4,4'-divalent stilbene or azobenzene radical which is optionally sulphonated.

Preferred phthalocyanine chromophoric groups are of the Formula (5):

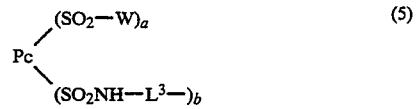

wherein Pc is a metallo-phthalocyanine nucleus, preferably copper or nickel phthalocyanine; each W independently is a hydroxy or a substituted or unsubstituted amino group; $L^3$ is a divalent organic linking group as hereinbefore defined, preferably $C_{2-4}$-alkylene, phenylene or sulphophenylene; and a and b each independently have a value of 1 to 3, provided that a+b is not greater than 4.

Preferred triphenodioxazine chromophoric groups are of the Formula (6):

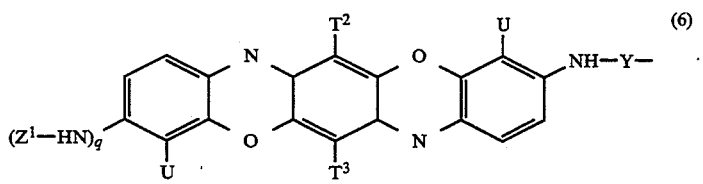

wherein:
$Z^1$ is H or a group of formula

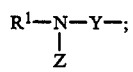

$R^1$ is H or $C_{1-4}$-alkyl;
Z is H, $C_{1-4}$-alkyl, phenyl or sulphophenyl;
each Y independently is $C_{2-4}$-alkylene, phenylene or sulphophenylene;
U is H or SO$_3$H;
$T^2$ and $T^3$ are halo or $C_{1-4}$-alkyl; and
q is 0 or 1.
each Y is preferably —C$_2$H$_4$— or —C$_3$H$_6$—. U is preferably SO$_3$H.
$T^2$ and $T^3$ are preferably Cl or $C_{1-4}$-alkyl, especially methyl.

Preferred formazan chromophoric groups are of the Formula (7):

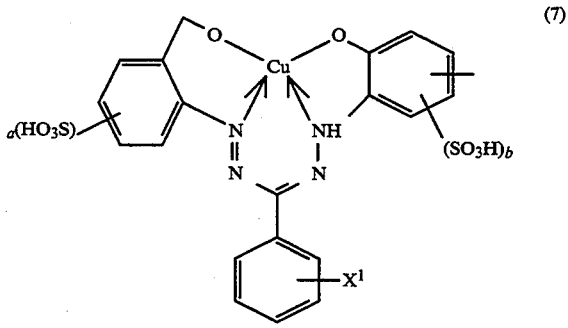

wherein:

$X^1$ is H or $S_3H$; and a and b each independently have a value of 0, 1 or 2; provided that the dye has at least one, and preferably at least two, sulpho groups.

It is preferred that a and b each have a value of 1.

In a preferred reactive dye of Formula (1), $D^1$ and $D^2$ are both of Formula (2), $L^1$ is phenylene, $L^2$ is optionally substituted naphthalene (as described above), n is 1, and T, $R^3$, $R^4$ are as hereinbefore defined.

Although dye formulae have been shown in the form of their free acid in this specification, the formulae are also intended to include such dyes in the salt form, particularly their salts with alkali metals such as the sodium, lithium or mixed sodium/lithium salt and optionally substituted ammonium salts. The term aryl as used in this specification includes heteroaryl.

A further feature of the present invention provides a composition comprising an inert carrier and a dye according to the invention, preferably in a weight ratio of 1:99 to 99:1, more preferably 50:1 to 1:50, especially 20:1 to 1:20. The inert carrier preferably comprises inorganic salts and optionally a de-dusting agent. Examples of inorganic salts include alkali and alkaline earth metal halides, carbonates, bicarbonates, nitrates and mixtures thereof. Dodecylbenzene may be used as de-dusting agent.

The reactive dyes of the present invention are suitable for colouring natural and artificial textile materials containing amino or hydroxyl groups, for example textile materials such as wool, silk and cellulosic materials. The textile materials are coloured bright shades and possess good fastness to light and to wet treatments such as washing and also have good wash off properties. The fastness in the perborate wet fade test is particularly good. The dyes are found to have good solubility in water.

A further feature of the invention comprises a process for the coloration of a textile material, especially a cellulosic textile material, comprising applying thereto a reactive dye according to the invention. For this purpose the dyes are preferably applied to the cellulosic textile material in conjunction with a treatment with an acid-binding agent, for example, sodium bicarbonate, sodium carbonate, sodium metasilicate, trisodium phosphate or sodium hydroxide, which may be applied to the cellulose textile material as an aqueous solution before, during or after the application of the dye. A temperature of 20°–200° C. is preferred in this process, especially 30°–80° C.

The new dyes can be applied to textile materials containing amino groups, such as wool and polyamide textile materials, from a mildly alkaline, neutral or acid dyebath. The dyebath may contain substances which are commonly used in the dyeing of textile materials containing amino groups, for example ammonium acetate, sodium sulphate, ethyl tartrate, nonionic dispersing agents such as condensates of ethylene oxide with amines, fatty alcohols or phenols, surface-active cationic agents such as quaternary ammonium salts for example cetyl trimethylammonium bromide and cetyl pyridinium bromide and organic liquids such as n-butanol and benzyl alcohol.

The invention is illustrated but not limited by the following Examples in which all parts and percentages are by weight unless stated otherwise.

Example 1

Preparation of a dye of the Formula (8) wherein T is H

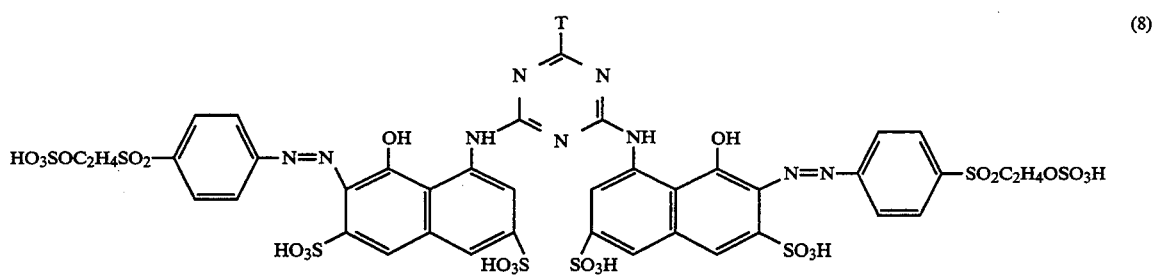

(8)

Stage a)

2N Sodium carbonate was added to a stirred suspension of 1-amino-8-hydroxynaphthalene-3,6-disulphonic acid (319 parts) in water (1000 parts) until a complete solution of approximately pH 6.0 was obtained.

This solution was added dropwise to a stirred suspension obtained by gradual addition of a solution of 2,6-dichloro-s-triazine (161 parts) in acetone (800 parts by volume) to ice-water (1000 parts) at 0°–5° C., the pH of the suspension being allowed to fall to 3 and then maintained at this value by addition of 2N sodium carbonate. The resultant mixture was stirred for a further 1 hour at 0°–5° C. and pH 3 to give a coupling component solution.

To a stirred mixture of 4-aminophenyl-β-sulphatoethylsulphone (309 parts) in ice-water (2000 parts) at 0°–5° C. was added aqueous hydrochloric acid (34.5% strength, 568 parts by volume) followed by 2N sodium nitrite (568 parts by volume). The mixture was stirred for 30 minutes at 0°–5° C. before destroying excess nitrous acid by addition of sulphamic acid. The resultant diazonium salt suspension was added to the above coupling component solution, the pH raised to 6 by addition of sodium carbonate, and the mixture stirred for a further 2 hours at 0°–5° C. The azo product was precipitated by salting with potassium chloride, isolated by filtration and dried to give a dry azo product.

Stage b)

The above dry azo product (497 parts) and 1-amino-8-hydroxynaphthalene-3,6-disulphonic acid (219 parts) were stirred together in water (11,000 parts) for 20 hours at 50° C. and pH 6.0 to 6.5, maintained by addition of 1N sodium carbonate as required. The resultant monoazo condensation product was precipitated by addition of potassium chloride and slow addition of acetone (3,300 parts by volume), isolated by filtration and dried.

Stage c)

To a stirred mixture of 4-aminophenyl-β-sulphatoethyl sulphone (115 parts) in ice-water (425 parts) at 0°–5° C. was added aqueous hydrochloric acid (34.5% strength, 124 parts by volume) followed by 2N sodium nitrite (209 parts by volume). The mixture was stirred for 30 minutes at 0°–5° C. before destroying excess nitrous acid by addition of sulphamic acid. The resultant diazonium salt suspension was stirred with a solution of the above monoazo condensation product in water (850 parts) for 2 hours at 0°–5° C. and pH 6.0 to 6.5, maintained by addition of 2N sodium carbonate as required. The product was precipitated by addition of potassium chloride followed by acetone, filtered off and dried to give the alkali metal salt of the title compound (λmax 536 nm).

The salt of the title dye was applied to cotton by exhaust dyeing and was found to have very good fixation efficiency and wash-off properties.

Example 2

Preparation of a Dye of Formula (8) Wherein T is Methyl

The method of Example 1 was repeated except that in place of 2,6-dichloro-s-triazine (161 parts) there was used 2,6-dichloro-4-methyl-s-triazine (176 parts) to give the alkali metal salt of the title compound (λmax 536 nm).

The salt of the title compound was applied to cotton by exhaust dyeing and was found to have very good fastness to light and washing.

Example 3

Preparation of was stirred for a further 2.5 hours to give a solution of the coupling component.

Stage b)

To a stirred mixture of 4-aminophenyl-β-sulphatoethyl sulphone (140.5 parts) in ice-water (3000 parts) at 0°–5° C. was added aqueous hydrochloric acid (34.5% strength, 150 parts by volume) followed by 2N sodium nitrite (250 parts by volume). The mixture was stirred for 1 hour at 0°–5° C. before destroying excess nitrous acid by the addition of sulphamic acid. The resultant diazonium salt suspension was added to the above coupling component solution, the pH raised to 6 to 6.5 by addition of sodium carbonate, and the mixture stirred for a further 2 hours at 0°–5° C. The azo product was precipitated by adding potassium chloride, isolated by filtration and dried.

Stage c)

The above dry azo product (178 parts) and 6-amino-1-hydroxy naphthalene-3-sulphonic acid (84.5 parts) were stirred together in water (5500 parts) for 20 hours at 50° C. and pH 6 to 6.5, maintained by addition of 1N sodium carbonate. The resultant solution was cooled to ambient temperature and the monoazo condensation product precipitated by salting with potassium chloride, isolated by filtration and dried.

Stage d)

To a stirred mixture of 4-aminophenyl-β-sulphatoethyl sulphone (46.6 parts) in ice-water (1800 parts) and aqueous hydrochloric acid (34.5% strength, 50 parts by volume) at 0°–5° C. was added 2N sodium nitrite (10 parts by volume). The mixture was stirred for 1 hour at 0°–5° C. and then any excess of nitrous acid destroyed

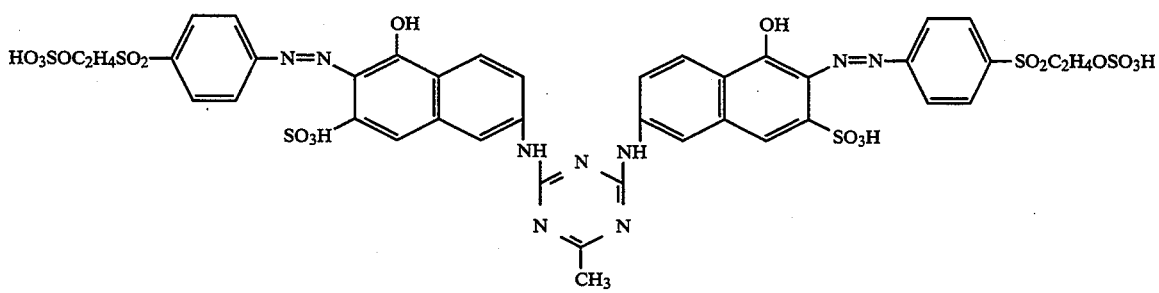

Stage a)

2N Sodium hydroxide was added to a stirred suspension of 6-amino-1-hydroxynaphthalene-3-sulphonic acid (119.5 parts) in water (1500 parts) until a complete solution of pH 6.5 was obtained. This solution was added dropwise to a stirred suspension obtained by gradual addition of a solution of 2,6-dichloro-4-methyl-s-triazine (113 parts) in acetone (1250 parts by volume) to ice-water (1500 parts) at 0°–5° C., the mixture being allowed to fall to pH 4 and then maintained at this pH by addition of 2N sodium carbonate. The resultant mixture by addition of sulphamic acid. The resultant diazonium salt suspension was added to a solution of the above monoazo condensation product (143 parts) in water (5000 parts) and the mixture stirred at 0°–5° C. and pH 6–6.5 for 2 hours. The product was precipitated by adding potassium chloride, isolated by filtration and dried to give the alkali metal salt of the title compound having a λmax at 478 nm.

The salt of the title compound was applied to cotton by exhaust dyeing and was found to have good fastness to light and washing.

Example 4

Preparation of

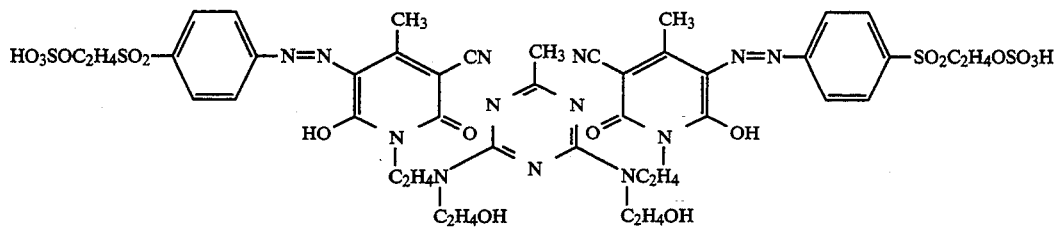

6-Hydroxy-1-[2-(2-hydroxyethylamino)ethyl]-4-methyl-2-oxo-1,2-dihydro-pyridine-3-carbonitrile (225 parts) was added to a stirred suspension obtained by gradual addition of a solution of 2,4-dichloro-6-methyl-s-triazine (164 parts) in acetone (1500 parts by volume) to ice-water (15000 parts) at 0°–5° C. and the resultant mixture stirred for 2.5 hours at 0°–5° C. whilst the pH of the solution was maintained at 6.0 to 6.5 by addition of in sodium carbonate as required. More 6-hydroxy-1-[2-(2-hydroxyethylamino)ethyl]-4-methyl-2-oxo-1,2-dihydro-pyridine-3-carbonitrile (225 parts) was added and the mixture heated to 65° C. and held at this temperature for 2 hours whilst the pH of the solution was maintained at 6.0 to 6.5 to give a solution of a coupling component.

To a stirred mixture of 4-aminophenyl-β-sulphatoethyl sulphone (562 parts), aqueous hydrochloric acid (34.5% strength, 1200 parts by volume) and ice-water (20000 parts) at 0°–5° C. was added 2N sodium nitrite (1100 parts by volume). The mixture was stirred for 45 minutes at 0°–5° C. before destroying excess nitrous acid by addition of sulphamic acid. The resultant diazonium salt suspension was added to the above coupling component solution and the resultant mixture stirred at 0°–5° C. for 2 hours whilst maintaining the pH at 5.5 by addition of 1N sodium carbonate as required. The disazo product was precipitated by adding KCl, isolated by filtration and dried to give the alkali metal salt of the title compound (λmax 427 nm).

The title product was applied to cotton by exhaust dyeing and was found to have good washfastness.

Examples 5 to 9

The method of Example 4 may be repeated except that in place of the compound listed in Column I, there is used an equivalent amount of the compound listed in Column II:

| Example | Column I | Column II |
| --- | --- | --- |
| 5 | 4-aminophenyl-β-sulphato-ethyl sulphone | 3-aminophenyl-β-sulphatoethylsulphone |
| 6 | 4-aminophenyl-β-sulphatoethyl sulphone | 3-amino-4-methoxyphenyl-β-sulphatoethyl sulphone |
| 7 | 2,4-dichloro-6-methyl-s-triazine | 2,4-dichloro-s-triazine |
| 8 | 2,4-dichloro-6-methyl-s-triazine | 2,4-dichloro-6-ethyl-s-triazine |
| 9 | 6-hydroxy-1-[2-(2-hydroxyethylamino)ethyl]-4-methyl-2-oxo-1,2-dihydropyridine-3-carbonitrile | 6-hydroxy-1-[2-(2-hydroxyethylamino)ethyl]-4-methyl-2-oxo-1,2-dihydropyridine-3-carbonamide |

Example 10

Preparation of

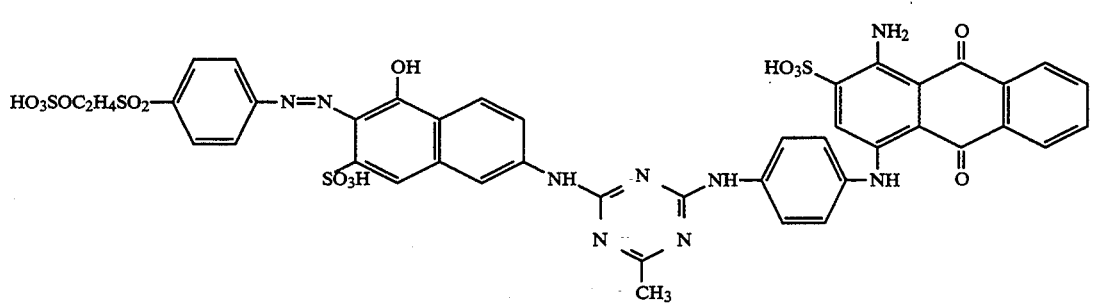

Stage a)

An azo product was prepared substantially as described in Example 3, Stages a) and b).

Stage b)

The product from Stage a) (7.8 g) and 4-N-(4'-aminophenyl)amino-1-aminoanthraquinone-2-sulphonic acid (2.8 g) (prepared by the reaction of 1-amino-4-bromoanthraquinone-2-sulphonic acid with 1,4-diaminobenzene in the presence of sodium carbonate and copper sulphate) were stirred in water (300 ml) at 45° C. for 16 hours, during which the pH was maintained at 6.2 by adding sodium carbonate solution (2M) as required.

The resultant mixture was cooled to room temperature and the product was precipitated by salting to 10% w/v with sodium chloride, collected by filtration, washed with 20% brine, and dried to give the alkali metal salt of the title compound (λmax 475 nm).

Examples 11 to 14

The method of Example 10 may be repeated except that in place of the compound listed in Column I, there is used an equivalent amount of the compound listed in Column II:

| Example | Column I | Column II |
|---|---|---|
| 11 | 4-aminophenyl-β-sulphatoethylsulphone | 3-aminophenyl-β-sulphatoethylsulphone |
| 12 | 2,4-dichloro-6-methyl-s-triazine | 2,4-dichloro-s-triazine |
| 13 | 4-N-(4'-aminophenyl)amino-1-aminoanthraquinone-2-sulphonic acid | 4-N-(3'-aminophenyl-4'-sulphonic acid)amino-1-aminoanthraquinone-2-sulphonic acid |
| 14 | 4-N-(4'-aminophenyl)amino-1-aminoanthraquinone-2-sulphonic acid | 4-N-(3'-aminophenyl-4'-sulphonic acid)amino-1-amino-2-methylanthraquinone |

Example 15

Preparation of

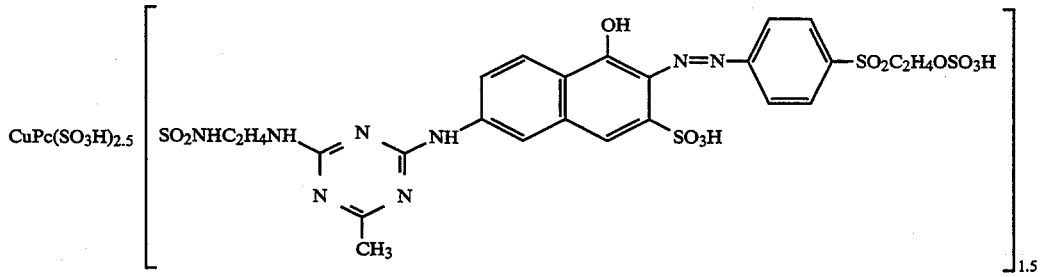

A mixture of copper phthalocyanine-N-β-aminoethylsulphonamidesulphonic acid (4.8 g) (prepared as described in GB 805,562, Example 12), and the product of Example 3, Stage b) (7.8 g) in water (300 ml) was stirred at 45° C. for 16 hours, during which the pH was maintained at 6.2 by the addition of sodium carbonate solution (2M) as required. The resultant mixture was allowed to cool to room temperature and the product was precipitated by the addition of acetone, collected by filtration, washed with acetone an dried to give the alkali metal salt of the title compound (λmax 669 nm).

The title product was applied to cotton by exhaust dyeing and was found to have good light fastness.

Examples 16 to 19

The method of Example 15 may be repeated except that in place of the compound listed in Column I, there is used an equivalent amount of the compound listed in Column II:

| Example | Column I | Column II |
|---|---|---|
| 16 | CuPc(SO$_3$H)$_{2.5}$(SO$_2$NHCH$_2$CH$_2$NH$_2$)$_{1.5}$ | NiPc(SO$_3$H)$_{2.5}$(SO$_2$NHCH$_2$CH$_2$NH$_2$)$_{1.5}$ |
| 17 | CuPc(SO$_3$H)$_{2.5}$(SO$_2$NHCH$_2$CH$_2$NH$_2$)$_{1.5}$ | CuPc(SO$_3$H)$_{1.4}$(SO$_2$NHC$_2$H$_4$NHC$_2$H$_4$OH)$_{2.6}$ |
| 18 | Example 3, Stage b) | Example 1, Stage a) |
| 19 | Example 3, Stage b) | Example 25, Stage b) |

Example 20

Preparation of

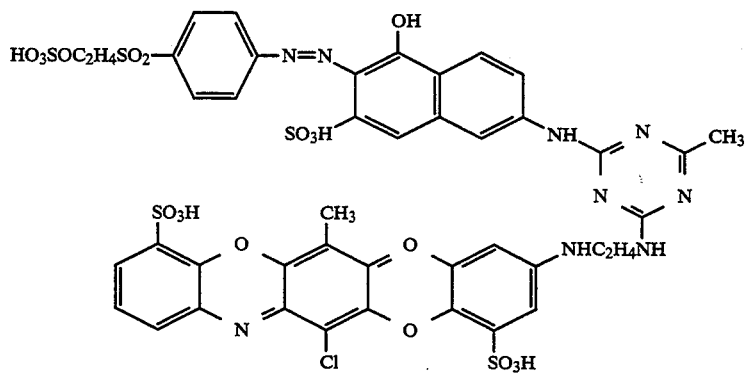

Stage a)

A solution of aminobenzene-3-sulphonic acid (8.75 g) in 50 ml water at pH 5.5 was added dropwise, over a period of 30 minutes, to a stirred mixture of methyl trichloroquinone (13.1 g) in methanol (750 ml). The pH was maintained at 5 to 5.5 using sodium hydroxide solution (2M). The mixture was stirred overnight at room temperature and then filtered. The solution was evaporated to dryness, the residue re-stirred in water (550 ml) and the monoanilide product filtered off, washed with water and dried.

Stage b)

A solution of N-(2-aminoethyl)-4-aminoaniline-2-sulphonic acid (7.0 g) in water (50 ml) at pH 7 was added to a stirred mixture of the product from Stage a) (7.0 g) in water (75 ml) and methanol (75 ml) at pH 6.5. The mixture was warmed to 45° C., stirred for 2½ hours at pH 6.5–7, allowed to cool to room temperature and stirred for 20 hours. The dianilide product was collected by filtration, washed with methanol and cold water and dried.

Stage c)

The product from Stage b) (2.0 g) was added to cold 10% oleum (25 ml). Ammonium persulphate (1.0 g) was added and the mixture was warmed to 45° C. and stirred for 5 hours. The mixture was allowed to cool to room temperature and poured into ice-water (300 ml). The resultant precipitate was collected by filtration, washed with water and acetone and dried, to give a triphenodioxazine dyebase.

Stage d)

A mixture of the product from Stage c) (1.9 g) and the product from Example 3, Stage b) (5.4 g) in water (150 ml) was stirred at 45° C. for 16 hours, during which the pH was maintained at 6.2 by adding sodium carbonate solution (2M) as required. The resultant solution was cooled to room temperature and the product precipitated by the addition of acetone, collected by filtration, washed with acetone and dried to give the alkali metal salt of the title compound ($\lambda$max 489 nm).

Examples 21–24

The method of Example 20 may be repeated except that in place of the compound listed in Column I, there is used an equivalent amount of the compound listed in Column II:

| Example | Column I | Column II |
|---|---|---|
| 21 | Example 3, Stage b) | Example 1, Stage a) |
| 22 | Example 3, Stage b) | Example 25, Stage b) |
| 23 | 2,4-dichloro-6-methyl-s-triazine | 2,4-dichloro-s-triazine |
| 24 | Methyltrichloroquinone | Tetrachloroquinone |

Example 25

Preparation of 2,4-dichloro-6-methyl-s-triazine (13.21 g) in acetone (150 ml) to ice-water (450 ml) at 0°–5° C., the pH of the suspension being allowed to fall to 3 and then maintained at this value by addition of 2M sodium carbonate. The resultant mixture was stirred for a further 1 hour at 0°–5° C. and pH 3 to give a coupling component solution.

Stage b)

4-Amino-$\beta$-sulphatoethylsulphone was diazotised using the general method of Example 3, Stage b). The resultant diazonium salt suspension was not isolated, instead it was added to the product of Stage a), the pH raised to 6 by addition of 2M sodium carbonate, and the mixture stirred for a further 2 hours at 0°–5° C. The resultant azo product was precipitated by adding KCl, isolated by filtration and dried.

Stage c)

A mixture of the product from Stage b) (5.17 g) and the copper salt of N-(2-hydroxy-5-sulpho-3-aminophenyl)-N'-(2-carboxy-4'-sulphophenyl)-ms-phenylformazan (21.22 g) (obtained by coupling diazotised 6-acetylamino-2-aminophenol-4-sulphonic acid with the hydrazone from benzaldehyde and 2-carboxyphenylhydrazine-4-sulphonic acid, coppering and hydrolysing the acetyl group with dilute caustic soda) in water (150 ml) was stirred for 5 hours at 50°–55° C. during which the pH was maintained at 6 to 6.5 by adding sodium carbonate solution (2M) as required. The solution was cooled to room temperature and the product was precipitated by the addition of acetone, collected by filtration, washed with acetone and dried to give the alkali metal salt of the title compound ($\lambda$max 550 nm).

Example 26–29

The method of Example 25 may be repeated except that in place of the compound listed in Column I, there is used an equivalent amount of the compound listed in Column II:

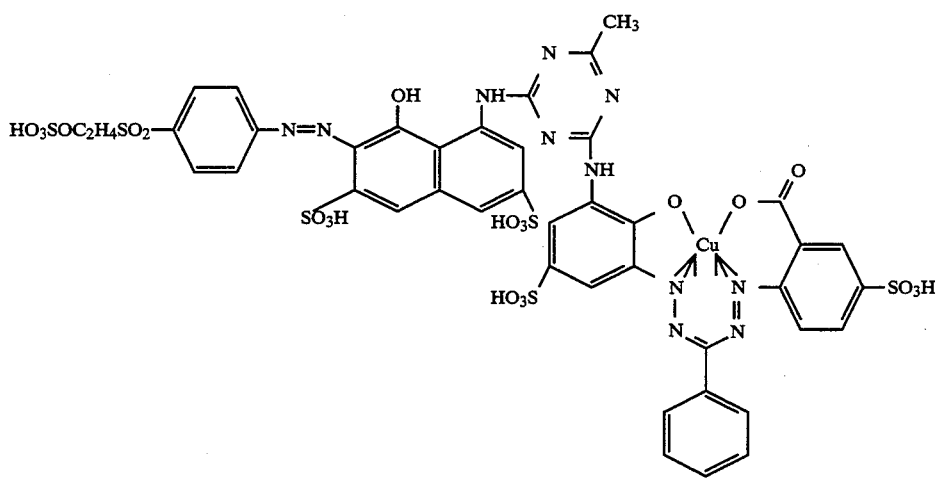

Stage a)

Sodium carbonate solution (2M) was added to a stirred suspension of 1-amino-8-hydroxynaphthalene-3,6-disulphonic acid (23.8 g) in water (450 ml) until a complete solution at approximately pH 6.0 was obtained. The solution was added dropwise to a stirred suspension obtained by gradual addition of a solution of

| Example | Column I | Column II |
|---|---|---|
| 26 | Example 25, Stage b) | Example 3, Stage b) |
| 27 | Example 25, Stage b) | Example 1, Stage a) |
| 28 | 4-aminophenyl-$\beta$-sulphatoethyl sulphone | 3-aminophenyl-$\beta$-sulphatoethylsulphone |
| 29 | 2,4-dichloro-6-methyl-s-triazine | 2,4-dichloro-s- |

-continued

| Example | Column I | Column II |
|---|---|---|
| | | triazine |

Example 30

Preparation of

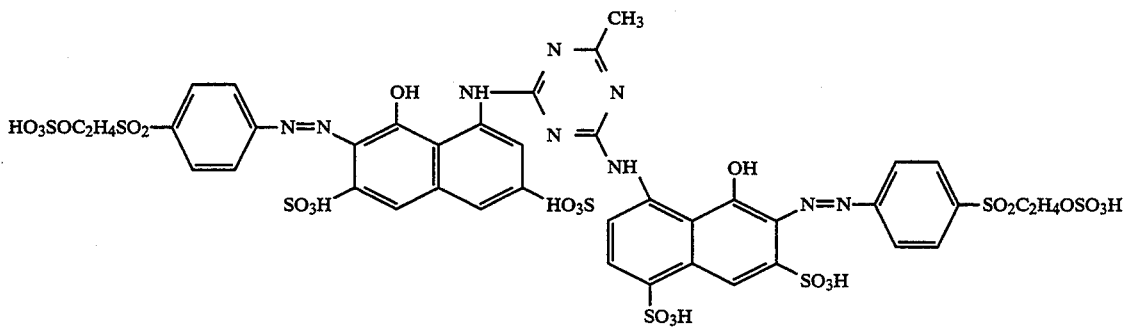

Stage a)

A solution of the product from Example 25, Stage b) (10.35 g) and 1-amino-8-hydroxynaphthalene-4,6-disulphonic acid (6.89 g) in water (150 ml) was stirred at 45° C. for 5 hours, maintaining the pH at 6 to 6.5 by the addition of sodium carbonate solution (2M) as required. The solution was allowed to cool to room temperature and the product precipitated by the addition of acetone. The dyebase product was collected by filtration, washed with 15% w/v KCl solution and acetone, then dried.

Stage b)

4-Aminophenyl-β-sulphatoethylsulphone (1.97 g) was diazotised using the general method of Example 3, Stage b). The resultant diazonium salt suspension was added to a solution of the product of Stage a) (31.78 g) in ice-water (150 ml) and the mixture stirred for 1½ hours at 0°–5° C., maintaining the pH at 6 to 6.5 by the addition of sodium carbonate as required. The product was precipitated by salting to 10% w/v with Nacl and then adding acetone (200 ml). The product was collected by filtration washed with acetone and dried to give the alkali metal salt of the title compound (λmax 522 nm).

The title product was applied to cotton by exhaust dyeing and was found to have good washfastness.

Example 31

Preparation of

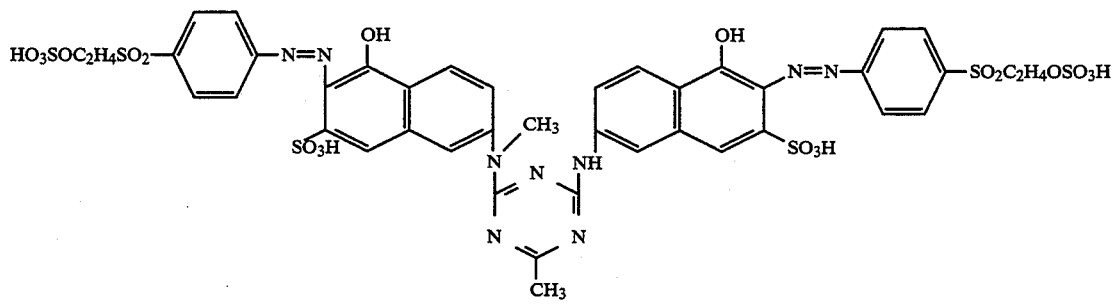

The method of Example 3 was repeated in a similar manner except that in Stage a) 6-(N-methyl)amino-1-hydroxynaphthalene-3-sulphonic acid used in place of 6-amino-1-hydroxynaphthalene-3-sulphonic acid.

The title product was obtained in the form of its alkali metal salt (λmax 479 nm).

The title product was applied to cotton by exhaust dyeing and was found to have good fixation.

Example 32

Preparation of

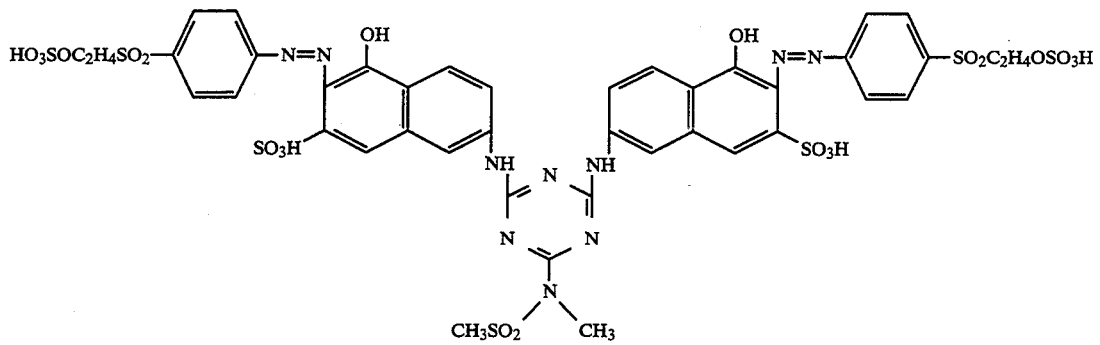

The method of Example 3 was repeated in a similar manner except that in Stage a) 2,6-dichloro-4-methanesulphonmethylamido-s-triazine was used in place of 2,6-dichloro-4-methyl-s-triazine.

The title product was obtained in the form of its alkali metal salt (λmax 484nra).

Example 33

The method of Example 1 may be repeated except that in place of 2,6-dichloro-s-triazine there is used an equivalent amount of 2,6-dichloro-4-methanesulphonmethylamido-s-triazine.

Example 34

The method of Example 4 may be repeated except that in place of 2,4-dichloro-6-methyl-s-triazine there is used an equivalent amount of 2,6-dichloro-4-methanesulphonmethylamido-s-triazine.

Example 35

The method of Example 25 may be repeated except that in place of 2,4-dichloro-6-methyl-s-triazine there is used an equivalent amount of 2,6-dichloro-4-methanesulphonmethylamido-s-triazine.

We claim:

1. A reactive dye comprising a 1,3,5-s-triazine group having a chromophoric group at two of the 2-, 4-and 6-positions and a substituent at the remaining 2-, 4- or 6-position selected from H, optionally substituted alkyl, $-CH(CO_2R^1)_2$ and $-NR^1SO_2R^2$ wherein $R^1$ is H or alkyl and $R^2$ is alkyl.

2. A reactive dye according to claim 1 wherein the substituent at the remaining 2-, 4- or 6-position is H or optionally substituted alkyl.

3. A reactive dye according to claim 1 wherein the substituent at the remaining 2-, 4- or 6-position is H or $C_{1-4}$-alkyl.

4. A reactive dye according to claim 1 of the formula:

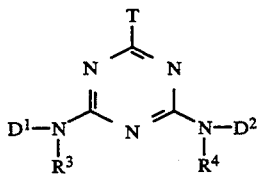

(1)

wherein $D^1$ and $D^2$ are each independently chromophoric groups;

$R^3$ and $R^4$ are each independently H or $C_{1-4}$-alkyl; and

T is H, optionally substituted alkyl, $-CH(CO_2R^1)_2(,)$ or $-NR^1SO_2R^2$;

each $R^1$ is H or alkyl; and $R^2$ is alkyl.

5. A reactive dye according to any one of the preceding claims which is free from organic chlorine.

6. A reactive dye according to claim 4 wherein $D^1$ and $D^2$ are different to each other.

7. A reactive dye according to claim 4 or claim 6 wherein $D^1$ and $D^2$ are of the Formula (2):

$$V-SO_2-L^1-(-N=N-L^2-)_n- \quad (2)$$

wherein:

V is vinyl or a group convertible to vinyl on treatment with aqueous alkali;

$L^1$ and $L^2$ are each independently an optionally substituted mono- or dicyclic aryl or heteroaryl radical; and n is 1 or 2.

8. A reactive dye according to claim 7 wherein $L^2$ is of Formula (3):

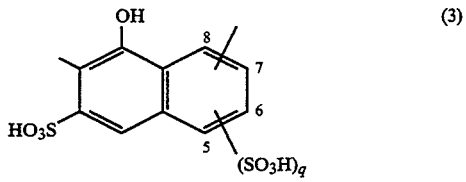

(3)

wherein q is 0 or 1.

9. A reactive dye according to claim 2 wherein the substituent at the remaining 2-, 4- or 6-position is H or methyl.

10. A reactive dye according to claim 9 wherein the substituent at the remaining 2-, 4- or 6-position is methyl.

11. A reactive dye according to claim 1, said dye having the formula

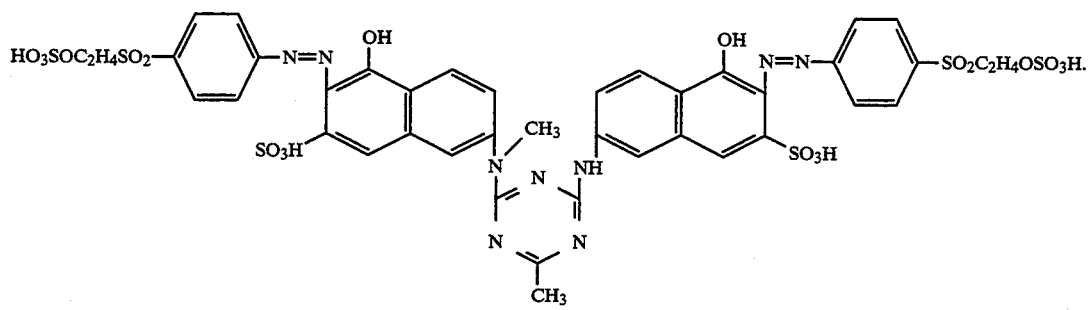
12. A process for the coloration of a textile material comprising applying thereto a reactive dye according to any one of claims 1, 4 or 7.
* * * * *